United States Patent [19]

Bogatzki

[11] 4,222,372
[45] Sep. 16, 1980

[54] SOLAR COLLECTOR ASSEMBLY

[76] Inventor: Hans-Ulrich Bogatzki, Ferdinand-Hodler-Str. 24, Zürich, Switzerland

[21] Appl. No.: 948,246

[22] Filed: Oct. 3, 1978

[30] Foreign Application Priority Data

Oct. 14, 1977 [CH] Switzerland ............... 012617/77

[51] Int. Cl.³ .................... F24J 3/02; F28F 1/00; B65D 21/00
[52] U.S. Cl. .................... 126/443; 126/438; 138/113; 138/149; 165/135; 165/177; 215/10; 285/DIG. 12
[58] Field of Search ............ 126/270, , 271, 442, 126/443, 450, 438; 237/1 A; 165/135, 177, 178; 215/10; 285/DIG. 12; 138/113, 149

[56] References Cited

U.S. PATENT DOCUMENTS

| Re. 29,833 | 11/1978 | Mlavsky | 126/443 |
|---|---|---|---|
| 1,345,758 | 7/1920 | Folsom | 126/443 |
| 3,125,091 | 3/1964 | Sleeper | 126/443 |
| 4,011,858 | 3/1977 | Hurkett | 126/271 |
| 4,084,577 | 4/1978 | Rhodes | 126/270 |
| 4,091,793 | 5/1978 | Hermann et al. | 126/271 |
| 4,094,300 | 6/1978 | Young | 126/271 |
| 4,119,085 | 10/1978 | Knowles et al. | 237/1 A |
| 4,129,119 | 12/1978 | Yoke | 126/270 |
| 4,144,931 | 3/1979 | Medico | 165/135 |
| 4,148,296 | 4/1979 | Parlato | 237/1 A |
| 4,149,523 | 4/1979 | Boy-Marcotte et al. | 126/271 |
| 4,151,828 | 5/1979 | Mather et al. | 126/271 |
| 4,162,093 | 7/1979 | Sigmund | 138/149 |

FOREIGN PATENT DOCUMENTS

| 2280036 | 3/1976 | France | 126/443 |
|---|---|---|---|
| 481787 | 3/1938 | United Kingdom | 215/10 |
| 869392 | 5/1961 | United Kingdom | 215/10 |

Primary Examiner—James C. Yeung
Assistant Examiner—Daniel O'Connor
Attorney, Agent, or Firm—Flynn & Frishauf

[57] ABSTRACT

Individual collector cells are fitted together in series along a heat transfer medium tube. The cells have a cylindrical housing with mating interconnecting flanges at the ends, through which the tube also passes. The flanges may have sealing gaskets. The housing has a transparent front side and a reflective back side. The cross-sectional configuration of the front is arcuate, while that of the back is parabolic. The cells are fixed with respect to the tube axis, but can rotate about it to follow the sun. Parallel cell rows can be interconnected to rotate together. Interconnected, articulated cell rows are disclosed as a removable cover for a swimming pool.

6 Claims, 7 Drawing Figures

SOLAR COLLECTOR ASSEMBLY

BACKGROUND OF THE INVENTION

The present invention relates to a collector arrangement for a solar energy heating system in which a plurality of cell elements cooperate with pipes for the passage of a heat exchange medium.

There is no doubt that there is only a limited supply of industrially extractable fossil energy sources, such as coal, oil, oil sand, oil shale, and natural gas. This applies more particularly to the present main energy source, oil. Even when taking account of new oil fields, it is excepted that oil supplies will be exhausted in about 50 years. Certain internationally recognized research institutes have in fact made even less favorable forecasts. However, even these pessimistic forecasts must not hide the fact that on the basis of the law of supply and demand the oil shortages which will occur much earlier will lead to considerable price rises. The effects of such oil rises for our economy became very apparent after the last oil crisis.

Attempts are therefore being made to find new independent energy sources. The main object of these efforts is to develop a maximum number of substitute energy sources, using these whenever possible in place of oil. World-wide statistics show that a large proportion of existing oil supplies is being used for heating purposes.

However, for this purpose solar energy constitutes an ideal substitute energy source. Quite apart from the fact that this energy is available free and in unlimited quantities, it is characterized by having no harmful effects on the environment. A further important advantage is that it can be used on a completely decentralized basis. However, it must be remembered that this energy can only be obtained by day and, in part, only with direct solar radiation. Account must also be taken of the fact that solar energy only has a relatively low intensity, particularly with clouded skies, when only the much less diffuse rays can be used.

A number of commercially usable systems for using solar energy for heating purposes are already known. In particular, a so-called solar cell system has been adopted, a distinction being necessary between flat cells and focussing cells.

In the case of flat cells, the basic construction is always essentially the same. A generally metallic flat body is provided with a radiation-absorbing surface which generally consists of black lacquer or some similar material. Pipes or ducts are placed in or on the body. Through the pipes or ducts circulates a heating exchange medium which conveys away the heat trapped by the absorbing surface. This heat can be used either directly or indirectly for heating purposes.

Since, according to the Stefan-Boltzmann law, each black body also emits thermal radiation whose intensity rises to the fourth power of its temperature, the cells are covered with one or more layers of glass or plastic. These glass or plastic layers are not transparent for the wavelength range of the rays emitted by the cell, so that the partly reflected rays are largely absorbed by the glass or plastic layers, where they are converted into heat, leading to the so-called hothouse effect.

The back of the cell is provided with a sufficiently thick insulating layer, so that only very small losses occur here.

To make the ratio between absorption and emission more favorable, in more sophisticated flat cells the black surface is replaced by a so-called selective surface. Selective surfaces have the advantage that the solar radiation is absorbed very well and emission is very small.

Flat cells have a number of advantages. Thus, they are able to convert even diffuse radiation into thermal energy. In addition, there is a good efficiency up to a heating medium temperature of 60° C. (Celsius). Furthermore, the flat cells are relatively inexpensive and simple to install.

However, reference must also be made to certain of the disadvantages of flat cells. A particular disadvantage is the poor efficiency in the high temperature range, temperatures above 100° C. (Celsius) being very difficult to obtain. Even in the case of optimum alignment of the cells relative to the sun, i.e. its position at midday, there is a particularly strong reflection from the flat covering plates in the morning and evening, due to the very acute angle of incidence, so that efficiency drops. This is very disadvantageous because, other than at night, it is particularly in the morning and evening that thermal energy is required. It is also very difficult to obtain an air-tight seal for the space between cell and covering layer. Moist air frequently enters this space and leads to fogging of the panes of glass, so that efficiency drops. The ideal solution would be a high vacuum in this space. However, due to the relatively large areas, even a low vacuum would cause the panes of glass to break. To obtain good efficiency, the cell surface must be aligned as precisely as possible with the mean solar position. However, in the case of house roofs which do not have this optimum position and inclination, installation is difficult or efficiency is low. For numerous reasons it is unlikely that a sail-like installation of the cells would be permitted. In addition, as the cells are generally only made in certain sizes, it is difficult to adapt them to particular roof shapes.

In the case of focussing solar cells, the incident solar radiation is focussed onto a point, line, or surface my means of an optical system, e.g. a mirror or lens system. In the case of solar cells for heating purposes, generally cylindrical-parabolic mirrors are used in which the incident rays are concentrated on a line. Rotationally symmetrical parabolic mirrors are less frequently encountered.

Cylindrical parabolic mirrors generally are made from glass, to the back of which is applied a thin silver coating. This coating reflects the incident rays onto the focal line of the parabolic mirror.

According to a further variant, the parabolic mirror is made from highly polished metal.

The absorber is also located in the focal line of the parabolic mirror. The absorber is generally constituted by black metal tubes or glass-covered black metal tubes, glass tubes with a black licquid which is simultaneously used as a heat carrier medium, or special metal profiles surrounded by a glass tube. A number of telescoped glass tubes could also be used, one being provided with a selective absorber coating and the underlying glass tube serving as a supply and discharge tube for the heat carrier medium.

An important feature of focussing cells is the concentration factor. This factor C forms the ratio of the admission surface of the cell to the absorber surface. The higher the factor C, the higher the temperature to which the carrier medium can be heated.

Advantages of focussing cells are, inter alia, that very high temperatures can be obtained as a function of the concentration factor. In the case of indirect further use, the temperature level is a measure for good efficiency. It is also advantageous that the emission and convection losses are much lower than with flat cells, due to the small absorber surface compared with the admission surface.

It is disadvantageous that focussing cells only operate with direct solar radiation, and must therefore follow the sun, which requires an additional mechanism. In addition, they are expensive to maintain and can only be installed on suitable roofs, preferably flat roofs. It is very difficult to install them on inclined house roofs. Their wind pressure sensitivity is a further disadvantage. They are also relatively costly, sizes cannot be varied as desired, due to their standard, and cannot be individually adapted readily to special requirements.

SUMMARY OF THE INVENTION

The problem to which the present invention is directed is to provide a system of cells combining at least the most important advantages of flat cells and focussing cells, while avoiding their disadvantages and which are particularly easy to manufacture and inexpensive, while permitting the widest possible range of applications.

According to the present invention the cell elements are bottle-shaped hollow bodies of glass or plastic, which can be placed in any desired number in juxtaposed manner on a tube and whose faces can be braced relative to one another, whereby the wall of the hollow body is spaced from and surrounds the tube.

Thus, such a cell element only has a neck and a base with an opening, the latter being able to receive the neck of a further hollow body in plug-in form. To provide adequate stability, the opening in the base can be bounded by an inwardly extending annular flange.

Such cell elements can be manufactured in an inexpensive manner in a glassworks by a bottle manufacturing process.

Preferably, the cell system is then constructed in such a way that a plurality of tubes, in each case carrying a plurality of cell elements, are arranged parallel to one another with a spacing corresponding approximately to the largest width of one cell element. Adjacent tube ends are elastically interconnected by tube bends or hoses. According to an advantageous further development the tubes carrying the cell elements are interconnected in articulated manner to form a Venetian blink-like arrangement.

DETAILED DESCRIPTION OF THE PREFERRED EMBODIMENTS

Figure 1:
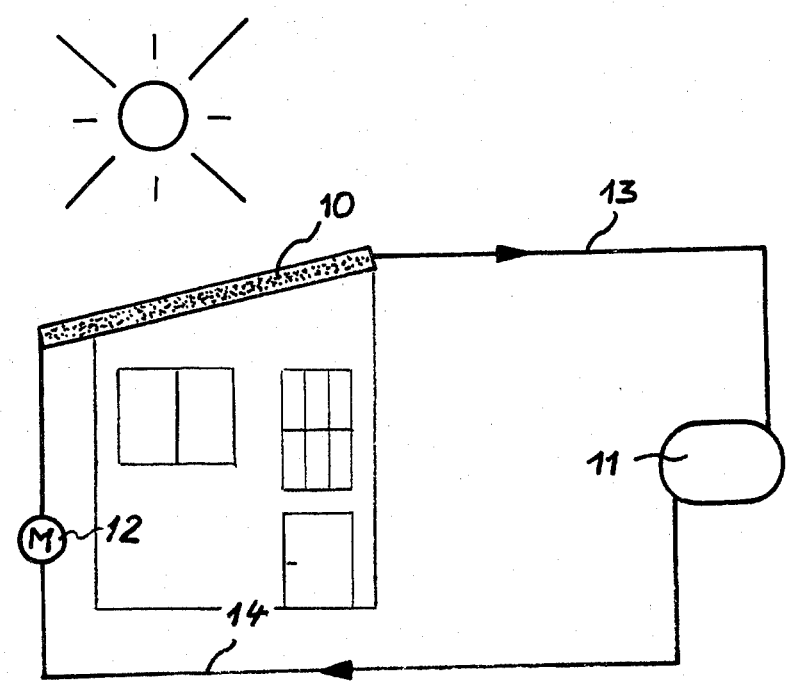
FIG. 1 is a schematic diagram of a solar heating system, including, as shown in block form, a solar collector assembly, which is in accordance with a preferred embodiment of the present invention.

In the solar energy heating system diagrammatically illustrated in FIG. 1, water as the heat exchange medium, is heated under the action of the sun in a cell system 10, preferably installed on the roof of a house, the water then being fed to a heat consuming means 11 in the form of a heating system, via a flow line 13. The water flow is driven by a circulating pump 12 into the return flow line 14 of the circuit system.

It is pointed out that in this way it is possible to connect a large number of further consuming means into the system. The consuming means can be of very varied types, e.g. hot water boilers and, in particular, swimming pools.

A cell system 10 which is particularly suitable for such a solar energy heating system is shown in FIGS. 2 to 7 and will be described in greater detail hereinafter.

Figure 2:
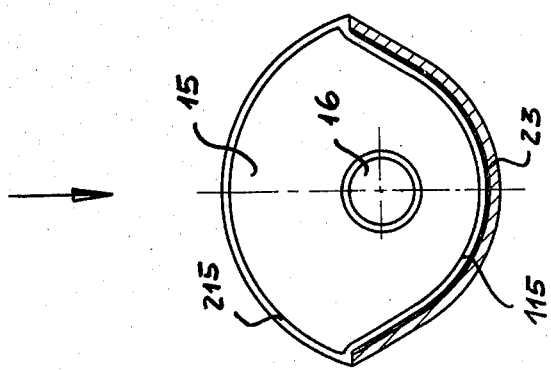
FIG. 2 shows both a longitudinal, sectional view of a linear fragment of a row of collector cell elements of the collector assembly of FIG. 1 and a cross-sectional view of one such cell element.
Figure 2:
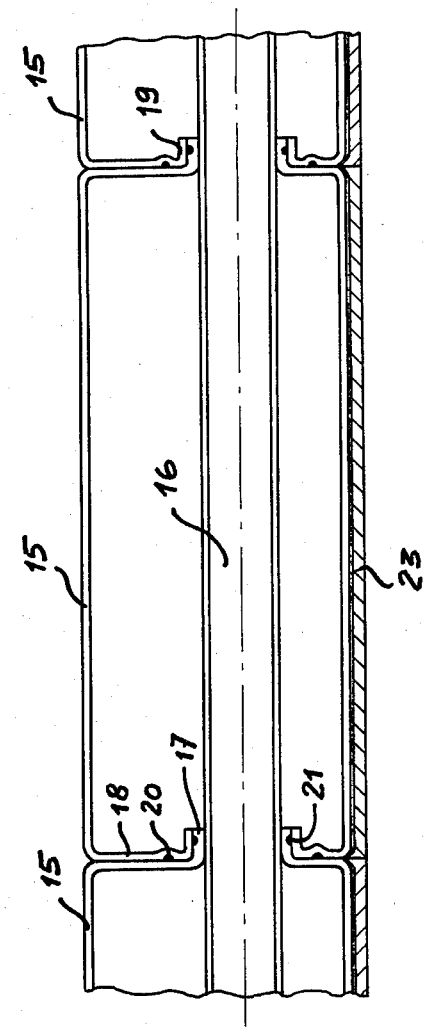

The essential feature for such a cell system are cell elements, formed in this case by bottle-shaped hollow bodies 15 made from glass or plastic, as is shown more particularly in FIG. 2, and which can be placed in any desired number and in juxtaposed manner on a tube 16. Each hollow body 15 has a neck 17, with an internal diameter corresponding to tube 16. The external diameter of neck 17 corresponds to the internal diameter of an opening in base 18 of hollow body 15 in such a way that neck 17 can be inserted with an adequate clearance into the opening in the base 18 of another hollow body 15. To provide adequate stability, the base opening is bounded by an inwardly extending annular flange 19. Annular slots 20, 21, which serve to receive a sealing compound or a ring gasket, are provided both in base 18 and on the wall of neck 17.

The hollow bodies 15 can be placed in any desired number on a correspondingly long tube 16 and can be reciprocally braced thereon by means, for example, of flanging means 22 (FIG. 3) which can be screwed onto the tube ends, so that a closed system is formed in such a way that hollow body 15 surrounds tube 16 as a continuous glass wall, the latter being spaced from and surrounding the tube.

As can be gathered from the cross-sectional drawing of FIG. 2, the wall of the bottle-shaped cell element 15 is subdivided into two halves forming a rear 115 and a front 215, the rear 115 being coated with a reflection coating 23, preferably a silver coating. As a result of this coating, the back 115 acts as a mirror. Efficiency can be further improved by metallizing the two faces.

In the cross-section according to FIG. 2, the wall of the bottle-shaped cell element 15 can have very varied configurations. For example, in cross-section the two wall faces can have a semi-circular configuration so that together they form a right circular cylinder. However, preferably front 215 is cross-sectionally semi-circular and back 115 is cross-sectionally substantially or at least partly parabolic.

To prevent the metallized coatings from being damaged by the weather, they are additionally covered or sealed by a top coating, e.g. of long life and weather-resistant plastic. This plastic coating also serves as an insulating coating.

Depending on the size of hollow body 15 and the diameter of tube 16, a particular desired concentration factor can be obtained. It is apparent that the tube 16 must be located approximately in the focal line of the back 115 which forms the mirror. Due to the relatively large diameter of the tube as compared with the opening surface, the tube can be fitted with a relatively low level of precision. Even in the variant where back 115 only has a round surface for reasons of simplicity, the tube will still be able to collect almost all the reflected rays.

A further variant for the reflection of rays is provided by an elastic shield with a reflecting coating which, when compressed, can be inserted into the cell elements, the shield being fixed in the particular element by springing back.

Figure 3:
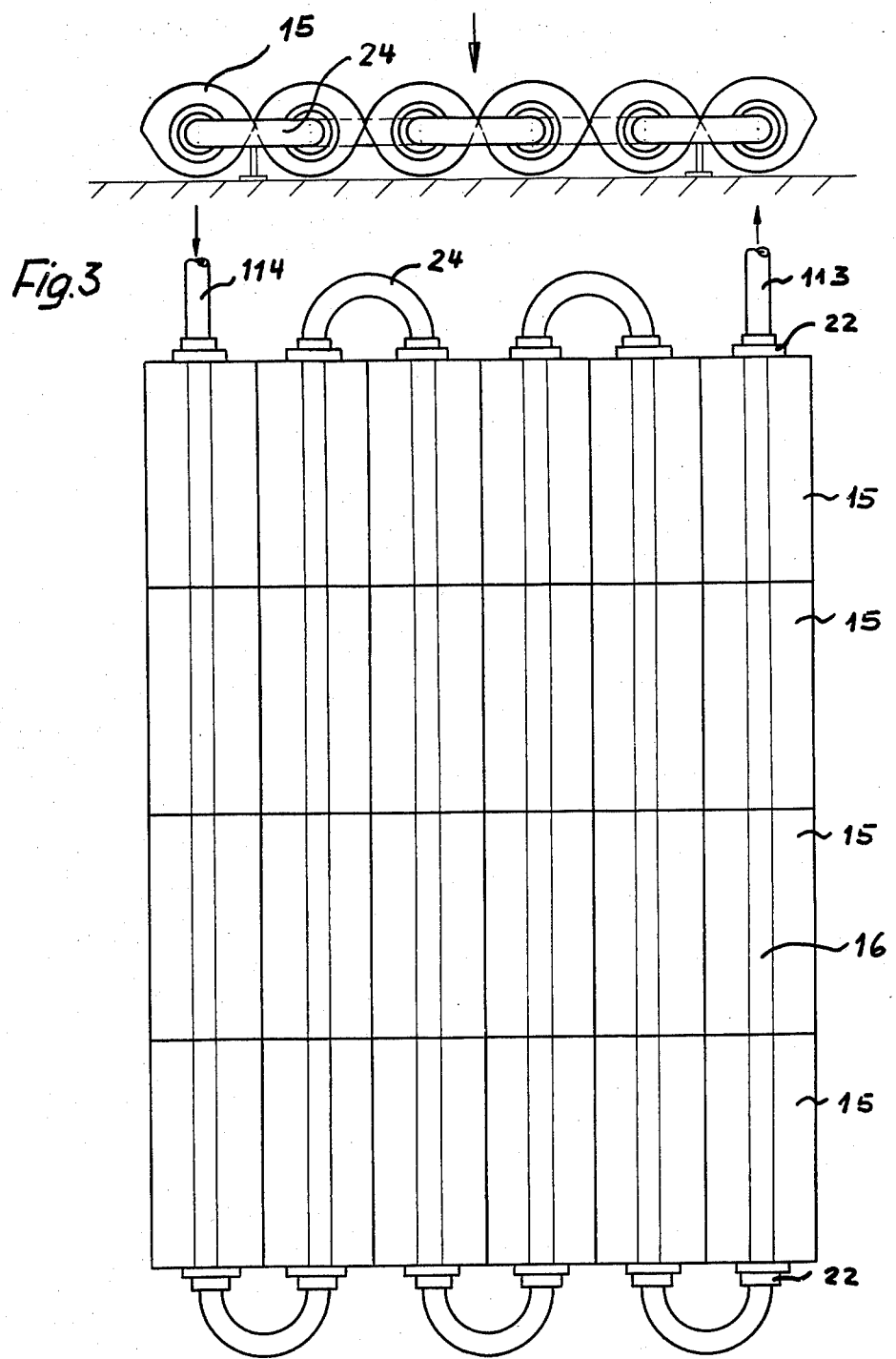
FIG. 3 shows both a partially schematic plan view, and also a partially schematic end view, of the collector assembly of FIG. 1.

As can be gathered more particularly from FIG. 3 a collector system is there formed in that a plurality of tubes 16, in each case carrying a plurality of cell elements 15, are arranged parallel to one another, preferably with a spacing which is approximately equal to the largest width of a cell element 15. Adjacent tube ends are interconnected by tube bends 24 or elastic hoses. This generally flat structure then has a continuous tube system with a connection 113 for the flow line 13 and a connection 114 for the return flow line 14 in FIG. 1. It is thus possible to assemble cell systems which can be adapted to virtually any roof shape and which has a wide range of uses, as will be described in greater detail hereinafter.

It is not only possible to obtain any desired size and adapt to any roof shape, but also possible to assemble a large number of very different cell shapes for architectural and aesthetic reasons. Thus, mosaic, star, and circular shapes can be obtained, which is certainly advantageous in view of the present attempts to obtain individuality.

Figure 4:
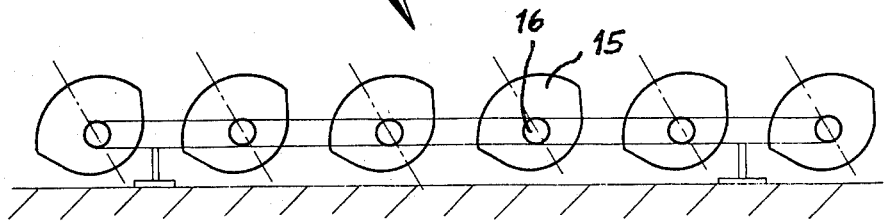
FIG. 4 is a schematic end view of the collector assembly of FIG. 1 showing the rows of cell elements all oriented in the same direction.

A further important advantage is provided by this system for houses whose roofs do not happen to be in the optimum position relative to the sum. In this case, the cells are admittedly arranged in juxtaposed flat manner on the roof, but by simply rotating the opening plane of the individual cell elements 15 about the tube axis in the direction of the mean position of the sun, the efficiency can be significantly increased (FIG. 4). Furthermore, through the convex shape of the hollow body surface, sloping incoming rays can be trapped much better than with e.g. flat cells.

As has been stated hereinbefore, due to the flat angle of incidence with flat cells the efficiency in the morning and evening is relatively poor and this is when, other than at night, most thermal energy is required.

Figure 5:
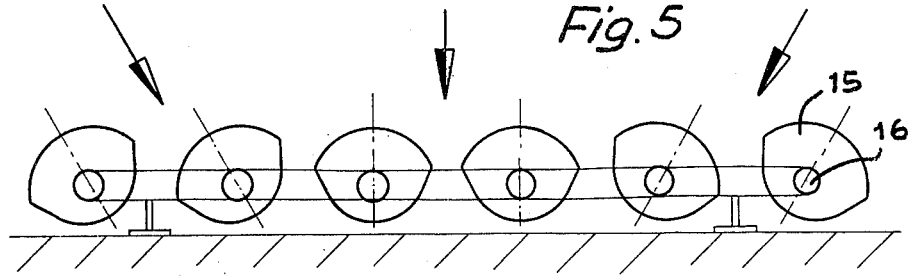
FIG. 5 is as schematic end view of the collector of FIG. 1 showing the rows of cell elements oriented in different directions to direct the collector assembly toward the mean direction of the sun.

The present system largely obviates this disadvantage in that, according to FIG. 5, a particular number of cell elements 15 are oriented more in one or the other direction. In addition, as a result of the convex sun-side halves 215 of hollow bodies 15, sloping incoming rays are much better trapped. Thus, a more uniform temperature gradient can be obtained throughout the day.

A further important advantage of the proposed system compared with prior art systems is obtained when it is installed on flat roofs. Whereas both the flat cell and the focussing cell must project from the roof surface to be oriented at the sun, according to the novel system the individual cell elements and an additional second roof membrane can be placed flat on the roof, so that only the opening planes of the individual cell elements have to be aligned with the mean solar position by rotating about the tube axis.

Figure 6:
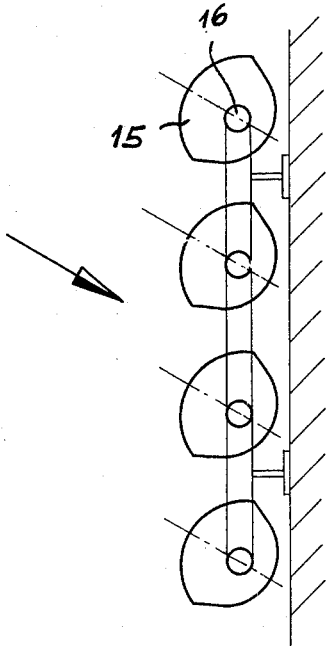
FIG. 6 is a schematic end view of a collector in accordance with a preferred embodiment of the present invention mounted on a vertical surface.

A further advantage of the present system is that it can also be usefully installed on vertical house or other masonry walls which face the sun (FIG. 6). In this case, the cell elements are advantageously aligned parallel to the earth's surface and the opening planes are aligned with the mean position of the sun by rotating about the tube axis. This system also acts as an additional wall and, in addition, functions as general weather-proofing, while also acting as additional thermal insulation.

In this connection, the cell systems could even be constructed for use as garden fences or the like.

Figure 7:
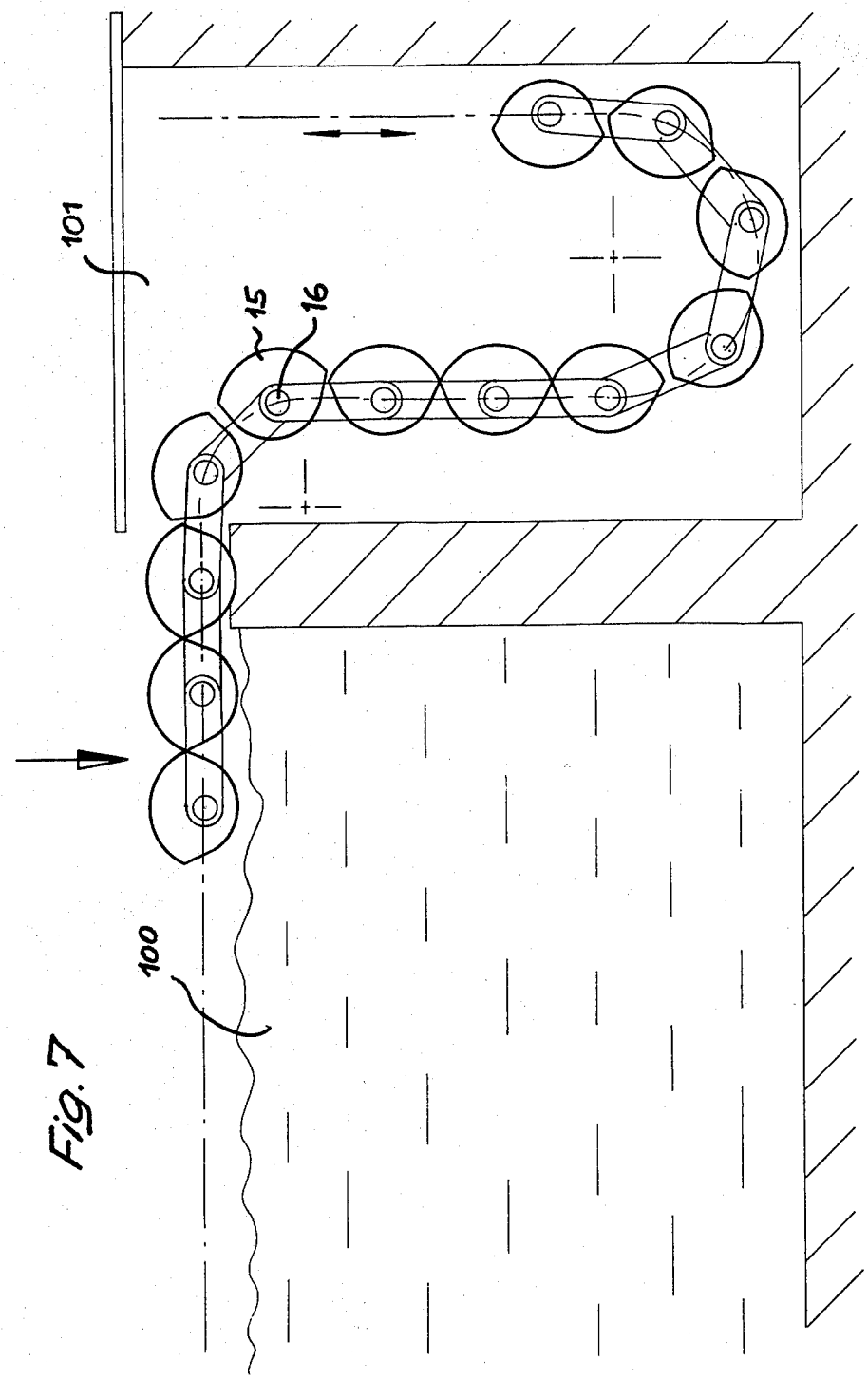
FIG. 7 is a schematic end view of an articulated collector in accordance with another embodiment of the present invention, the collector being arranged for covering a portion of, or all of, a swimming pool.

A further possible use is illustrated in FIG. 7 in which the parallel tubes 16 carrying the cell elements 15 are interconnected in articulated manner in such a way that they form a Venetian blink-like arrangement. In this embodiment, the Venetian blink arrangement serves simultaneously to cover a swimming pool 100 and can appropriately be moved into or out of a corresponding room or chamber 101. The articulated connections between the individual tubes may be articulated screw couplings or chain links.

A very important advantage of the present cell system is that it has both the main features of a flat cell and of a focussing cell. Thus, as a function of the ratio of the opening plane to the tube diameter a predetermined concentration factor can be obtained, so that the temperatures can be higher than those obtained with a flat cell. Furthermore, a larger proportion of diffuse radiant energy can be collected and converted into thermal energy.

In addition, such a cell system can be constructed so as to offer maximum resistance to aging and to the weather. The air can also be sucked out of the space between the tube and the hollow body and a vacuum produced in this space in advantageous manner. Such a cell system can also be extended or modified at any time and in simple manner. This is very important, because the requirements made on a heating system can constantly vary. Furthermore, all the components of the system can easily be produced in standard sizes and can be assembled by untrained people on a do-it-yourself basis. This is particularly significant from the cost angle for private householders. However, even if a person is undecided, his performance of a simple experiment can make a decision much easier, costs being very low. This will be a particular advantage during the initial introductory phase. Thus, the individual components can be sold by do-it-yourself chains and mail order houses, thus appealing to a much larger segment of the purchasing public.

If glass is used for the cell elements, this can be manufactured particularly inexpensively in a glassworks by a conventional bottle production process.

I claim:

1. A solar energy collector assembly, comprising a plurality of individual collector cells mounted in series along a tube which carries a circulating heat transfer medium, each of said cells having a hollow cylindrical housing made from a material which is transparent to solar radiation, said housing comprising a shell having seamless cylindrical walls of a cross-sectional shape constituted by two curves of different curvature concave towards each other and merging together at the curve ends, said cylindrical walls being provided with end walls extending towards said tube, one end wall having an aperture in its midportion for passage of said tube therethrough and a cylindrical neck extending beyond said end wall parallel to the axis of said tube and fitting around said tube, and the other end wall having an aperture in its midportion fitting the outer diameter of said neck of another housing forming part of another cell.

2. A solar energy collector assembly as defined in claim 1, in which the end wall having an aperture fitting the outer diameter or the neck of another cell housing has an inwardly directed flange fitting around said neck.

3. A solar energy collector assembly as defined in claim 1, in which the clearance of the fitting of said neck and aperture to the outer diameter of said tube and the clearance of said aperture that fits the outer diameter of said neck, close enough for holding said cells radially positioned on said tube and sufficient for permitting said cells to be rotated about the longitudinal axis of said tube.

4. A solar energy collector assembly as defined in claim 1, in which at least the portion of said cylindrical walls curved in accordance with one of said cross-sectional curves has a reflective coating.

5. A solar energy collector assembly as defined in claim 1, in which each of said cells also comprises a reflective member fixed in place inside said housing by supports.

6. A solar energy collector assembly as defined in claim 1, in which one of said cross-sectional curves is substantially a circular arc and the other is substantially a parabolic arc.

* * * * *